(12) United States Patent
Ning et al.

(10) Patent No.: US 11,478,672 B2
(45) Date of Patent: Oct. 25, 2022

(54) METHOD FOR DETOXIFYING CHROMIUM SLAG BY USING HIGH SULFUR COAL

(71) Applicant: Kunming University of Science and Technology, Kunming (CN)

(72) Inventors: Ping Ning, Kunming (CN); Bin Li, Kunming (CN); Liwei He, Kunming (CN); Zhang Lin, Kunming (CN); Xueming Liu, Kunming (CN)

(73) Assignee: Kunming University of Science and Technology, Kunming (CN)

( * ) Notice: Subject to any disclaimer, the term of this patent is extended or adjusted under 35 U.S.C. 154(b) by 422 days.

(21) Appl. No.: 16/809,685

(22) Filed: Mar. 5, 2020

(65) Prior Publication Data

US 2020/0282252 A1   Sep. 10, 2020

(30) Foreign Application Priority Data

Mar. 6, 2019   (CN) .......................... 201910167029.1

(51) Int. Cl.
*A62D 3/36* (2007.01)
*C22B 7/04* (2006.01)
*A62D 3/37* (2007.01)
*C22B 34/32* (2006.01)
*A62D 101/40* (2007.01)

(52) U.S. Cl.
CPC ................. *A62D 3/36* (2013.01); *A62D 3/37* (2013.01); *C22B 7/04* (2013.01); *C22B 34/32* (2013.01); *A62D 2101/40* (2013.01); *A62D 2203/02* (2013.01)

(58) Field of Classification Search
CPC ........ A62D 3/36; A62D 3/37; A62D 2101/40; A62D 2203/02; C22B 7/04; C22B 34/32
USPC ......................................................... 588/318
See application file for complete search history.

(56) References Cited

U.S. PATENT DOCUMENTS

2011/0179907 A1* 7/2011 Edlinger ................... C22B 7/04
75/10.14

\* cited by examiner

*Primary Examiner* — Edward M Johnson
(74) *Attorney, Agent, or Firm* — Harness, Dickey & Pierce, P.L.C.

(57) ABSTRACT

The present invention discloses a method for detoxifying chromium slag by using high sulfur coal. The method includes: sieving chromium slag into coarse-grained chromium slag and fine-grained chromium slag, air-drying and crushing both the coarse-grained chromium slag and the fine-grained chromium slag; separately mixing the crushed coarse-grained chromium slag and fine-grained chromium slag with the crushed high sulfur coal uniformly; adjusting pH values of a coarse-grained slag mixture and a fine-grained slag mixture to 8.0-11.0 and moisture content thereof to 12%-18%; conducting reduction on the treated coarse-grained slag mixture and fine-grained slag mixture, where the reduction temperature of the fine-grained slag mixture is 500-700° C., the reduction time of the fine-grained slag mixture is 10-30 min, the reduction temperature of the coarse-grained slag mixture is 800-1000° C., the reduction time of the coarse-grained slag mixture is 10-30 min; after the reduction, conducting water quenching, and discharging the product.

6 Claims, 3 Drawing Sheets

METHOD FOR DETOXIFYING CHROMIUM SLAG BY USING HIGH SULFUR COAL

CROSS-REFERENCE TO RELATED APPLICATION

This application claims priority to Chinese Application No. 201910167029.1, filed Mar. 6, 2019. The disclosure of the above application is incorporated herein by reference.

FIELD

The present invention relates to a method for detoxifying chromium slag by using high sulfur coal, belongs to the field of waste treatment and clean coal utilization, and implements clean utilization of high sulfur coal while thoroughly detoxifying chromium slag.

BACKGROUND

Chromium slag is a type of toxic and harmful solid waste generated in the process of producing a chromium salt through calcination. Its main components include oxides or basic compound salts of chromium, iron, aluminum, calcium, magnesium, and silicon. The harm of chromium compounds to the human body is related to their valence and water solubility. Chromium metal and trivalent chromium are harmless to the human body. Hexavalent chromium is a skin disease and lung sensitizer with carcinogenic and mutagenic characteristics, and is highly toxic to the respiratory tract, liver, kidney, gastrointestinal tract, immune system, and blood after being inhaled by the human body. Therefore, chromium slag is listed in the National Catalogue of Hazardous Wastes because it contains a large amount of hexavalent chromium. The hexavalent chromium in the chromium slag mainly exists in forms of sodium chromate tetrahydrate, calcium chromate, chromium calcium aluminate, basic ferric chromate, etc. A large amount of chromium slag stockpiled in the open air has been exposed to the sun and rain for a long time. Toxic hexavalent chromium in the chromium slag has been migrated to the soil, surface water, and groundwater due to the leaching action, causing serious pollution to the surrounding environment and nearby water resources, and eventually causing great harm to the life and health of residents through enrichment by a food chain.

Environmental and social problems resulting from chromium slag pollution are increasingly serious. Therefore, it is urgently needed to effectively control the chromium slag pollution. The key of detoxifying chromium slag is reducing hexavalent chromium to trivalent chromium by using a reducing agent. According to different reaction media in a reduction process, detoxification methods can be divided into dry detoxification and wet detoxification. Dry detoxification is easy to operate and convenient for ex-situ treatment, and can be used for treating a large amount of chromium slag. Therefore, a dry detoxification process is usually used to treat chromium slag in the industrial application. The dry method for detoxifying chromium slag can also be divided into a gas phase reduction method and a solid phase reduction method according to different reducing agents. In the gas phase reduction method, $H_2$, $CH_4$, $CO$, or other reducing gas is used as a reducing agent; while in the solid phase reduction method, carbon powder, wood chips, rice husks, coal gangue, etc. are usually used as reducing agents. However, due to high consumption of a reducing agent and an extremely high requirement for equipment in a high temperature condition, the dry detoxification still has problems of high reducing agent costs, high one-off investment, and high energy consumption. High sulfur coal mainly contains carbon, and has relatively strong reducibility and a relatively high calorific value. Therefore, it is well suited as a reducing agent for the dry method for detoxifying chromium slag. An energy structure in China mainly includes coal. However, in China, there are a large total amount of coal resources, but recoverable reserve per capita is very small. Moreover, high sulfur coal accounts for a large proportion of the coal resources. However, sulfur content in high sulfur coal is greater than 3%, and the combustion of high sulfur coal will cause great pollution to the environment. Therefore, high sulfur coal mining is restricted. Based on the characteristics of the coal resources in China, the long-term prohibition of coal resource mining is not conducive to the development of economy and society. Therefore, the clean utilization of high sulfur coal is worthy of in-depth study and exploration.

SUMMARY

In view of the problems of high energy consumption and excessively high treatment costs in existing dry technologies for detoxifying chromium slag, the present invention proposes a technology for detoxifying chromium slag by using high sulfur coal as a reducing agent. The high sulfur coal has a large stock and low costs, and it is urgently needed to study a way of clean utilization of the high sulfur coal to relieve the restriction on high sulfur coal mining. In the present invention, in-depth study is conducted on a mechanism of dry detoxification of chromium slag; an acid solution is sprayed before the high-temperature reduction reaction, to promote coal gasification of high sulfur coal and complete release of hexavalent chromium in chromium slag; a method for segmented reduction of chromium slag is used; and a conventional rotary kiln is modified to a helical stirring rotary kiln, so as to expand the production scale and improve the detoxification efficiency. The present invention provides a dry method for efficiently detoxifying chromium slag at low costs, to prevent the environmental pollution caused by chromium slag and realize the clean utilization of high sulfur coal.

A method for detoxifying chromium slag by using high sulfur coal is provided, specifically including the following steps:

(1) sieving chromium slag into coarse-grained chromium slag and fine-grained chromium slag, where a grain size of the coarse-grained chromium slag is greater than or equal to 10 meshes, and a grain size of the fine-grained chromium slag is less than 10 meshes; air-drying and crushing both the coarse-grained chromium slag and the fine-grained chromium slag; and air-drying and crushing high sulfur coal;

(2) separately mixing the crushed coarse-grained chromium slag and fine-grained chromium slag in step (1) with the high sulfur coal uniformly, to obtain a coarse-grained slag mixture and a fine-grained slag mixture;

(3) adjusting pH values of the coarse-grained slag mixture and the fine-grained slag mixture in step (2) to 8.0-11.0 and moisture content thereof to 12%-18% by spraying water or an acid solution;

(4) separately conducting reduction on the treated coarse-grained slag mixture and fine-grained slag mixture in step (3) in a rotary kiln, where the reduction temperature of the fine-grained slag mixture is 500-700° C., the reduction time of the fine-grained slag mixture is 10-30 min, the reduction temperature of the coarse-grained slag mixture is 800-1000° C., and the reduction time of the coarse-grained slag mixture is 10-30 min; and (5) mixing reduced coarse-grained slag mixture and fine-grained slag mixture in step (4), conducting water quenching for cooling the slag mixture to below 300° C., and discharging the product.

The coarse-grained chromium slag, the fine-grained chromium slag, and the high sulfur coal in step (1) are air-dried at normal temperature for more than 24 h, and the coarse-grained chromium slag, the fine-grained chromium slag, and the high sulfur coal are all crushed until they can pass through a sieve of 20 meshes.

In step (2), the mass fractions of chromium slag in the coarse-grained slag mixture and the fine-grained slag mixture are 85%-95%, the mass fraction of the high sulfur coal is 5%-15%, and a total mass fraction of the chromium slag and the high sulfur coal is 100%.

The acid solution in step (3) is a dilute $H_2SO_4$ solution, a $FeSO_4$ solution, etc.

The rotary kiln in step (4) is internally provided with a helical stirring device, where the helical stirring device includes a helical blade 1 and a rotary rod 2; the rotary rod 2 traverses the rotary kiln; and the helical blade 1 is arranged on the rotary rod 2. Helical stirring is conducted to make the chromium slag and the high sulfur coal fully mixed in the reduction process and make reducing gases: carbon monoxide and sulfur dioxide generated by the combustion of the high sulfur coal be in full contact, so as to improve the reduction efficiency of the process and expand the treatment scale of the process.

A solvent for water quenching in step (5) is water or a $FeSO_4$ solution, and the mass fraction of the $FeSO_4$ solution is 1%-5%.

In the present invention, a leaching concentration of hexavalent chromium in reduced chromium slag is less than 0.1 mg/L, and an emission value of sulfur dioxide in the process is lower than 200 mg/m$^3$, which satisfies a national environmental protection requirement on technologies for treatment of chromium slag.

Compared with the prior art, the present invention has the follow significant effects:

1. Reducibility and a high calorific value of high sulfur coal with a relatively large stock are effectively utilized, greatly lowering reducing agent costs and energy consumption in the dry method for detoxifying chromium slag; and the method is simple and easy to operate and is convenient for the industrial application.

2. A component with catalytic activity in chromium slag is used, and a pH value and water content of a system are adjusted. In this way, on one hand, a mineral containing hexavalent chromium in the chromium slag is decomposed, promoting the reaction that allows insoluble calcium chromate to be transformed into soluble sodium chromate; on the other hand, high sulfur coal is subject to the coal gasification reaction under the catalytic action of the chromium slag, accelerating the generation of CO; and generated $H_2$ with a relatively small molecular weight penetrates through an original mineral lattice of the chromium slag more easily, so that hexavalent chromium in the chromium slag can be detoxified more thoroughly and the detoxification efficiency can also be improved.

3. A large amount of calcium-based and magnesium-based compounds existing in the chromium slag and with sulfur fixation and desulfuration functions are used, so as to reduce the emission amount of sulfur dioxide during the combustion of high sulfur coal; and a property that hexavalent chromium in the chromium slag can be reduced by sulfur dioxide is used, to remove a very amount of sulfur dioxide that is not fixed and removed, finally realizing the clean utilization of high sulfur coal.

4. Based on a significant difference between total amounts and leaching amounts of hexavalent chromium contained in chromium slag with different grain sizes in the chromium slag, the chromium slag is sieved into coarse-grained chromium slag with a relatively low total amount and leaching amount of hexavalent chromium and fine-grained chromium slag with a relatively high total amount and leaching amount of hexavalent chromium; and they are respectively fed to a high temperature section and a low temperature section of the process, so as to greatly reduce thermal energy required in the dry process for detoxifying chromium slag.

5. Based on a mechanism in which the high temperature reduction reaction in the dry process for detoxifying chromium slag is mainly controlled by a mass transfer process, helical stirring is conducted to make the chromium slag and the high sulfur coal fully mixed and make reducing gases: carbon monoxide and sulfur dioxide generated by the combustion of the high sulfur coal be in full contact. In addition, the problem of incomplete detoxification caused by wall sticking and kiln blocking in a conventional process for detoxifying chromium slag by a rotary kiln can be resolved, so as to greatly expand the treatment scale of the process and improve the detoxification efficiency.

6. The present invention resolves the environment pollution problem resulting from chromium slag while satisfying a national environmental protection requirement on technologies for treatment of chromium slag, and proposes a way for the clean utilization of high sulfur coal, facilitating the effective utilization of national resources.

DRAWINGS

In the figures, 1-helical blade, 2-rotary rod, and 3-outer wall of a rotary kiln.

DETAILED DESCRIPTION

The following embodiments are intended to describe the present invention but are not intended to limit the scope of the present invention.

Embodiment 1

Figure 1:
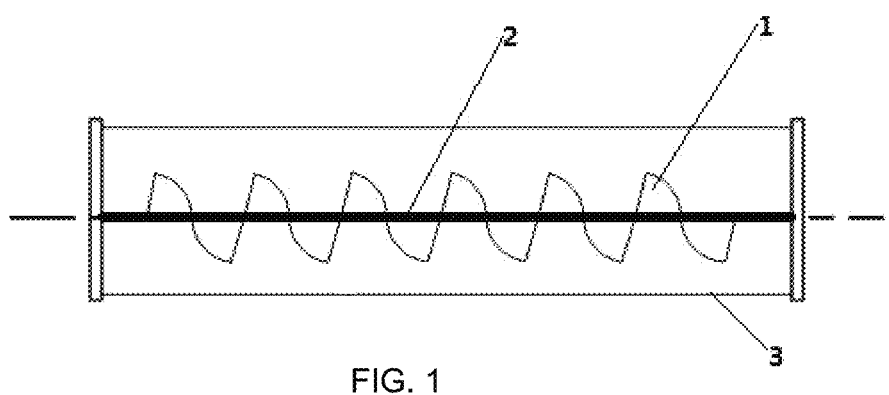
FIG. 1 is a schematic diagram (front view) of a helical stirring structure of a rotary kiln according to Embodiment 1 of the present invention.
Figure 2:
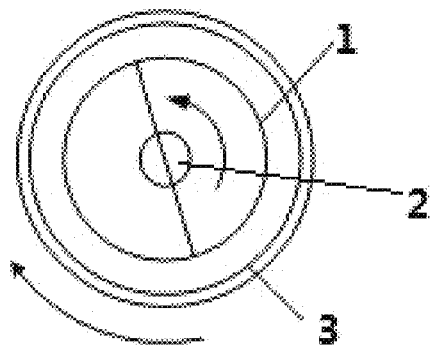
FIG. 2 is a schematic diagram (left view) of the helical stirring structure of the rotary kiln according to Embodiment 1 of the present invention.

A method for detoxifying chromium slag by using high sulfur coal is provided, specifically including the following steps:

(1) material preparation: sieving chromium slag into coarse-grained chromium slag (greater than or equal to 10 meshes) and fine-grained chromium slag (less than 10 meshes), air-drying both the coarse-grained chromium slag and the fine-grained chromium slag at normal temperature for 24 h, and crushing both the coarse-grained chromium slag and the fine-grained chromium slag until they can pass through a sieve of 20 meshes; and air-drying high sulfur coal at normal temperature for 24 h, and crushing the high sulfur coal until it can pass through the sieve of 20 meshes;

(2) mixing: separately mixing the coarse-grained chromium slag and the fine-grained chromium slag in step (1) with the high sulfur coal uniformly, to obtain a coarse-grained slag mixture and a fine-grained slag mixture, where the mass fractions of chromium slag in the coarse-grained slag mixture and the fine-grained slag mixture are both 95%, and the mass fraction of the high sulfur coal is 5%;

(3) adjustment of pH values and moisture content: adjusting pH values of the coarse-grained slag mixture and the fine-grained slag mixture to 11.0 and moisture content of the slag mixture to 12% by spraying water;

(4) reduction: in a rotary kiln, separately conducting reduction on the coarse-grained slag mixture and the fine-grained slag mixture whose pH values are adjusted in step (3), where the reduction temperature of the fine-grained slag mixture is 600° C., the reduction time of the fine-grained slag mixture is 30 min, the reduction temperature of the coarse-grained slag mixture is 800° C., and the reduction time of the coarse-grained slag mixture is 20 min; the rotary kiln is internally provided with a helical stirring device; as shown in FIG. 1 and FIG. 2, the helical stirring device includes a helical blade 1 and a rotary rod 2, the rotary rod 2 traverses the rotary kiln, the helical blade 1 is arranged on the rotary rod 2, and the helical blade 1 and the rotary rod 2 are closed in the rotary kiln by an outer wall 3 of the rotary kiln; and helical stirring is conducted to make the chromium slag and the high sulfur coal fully mixed in the reduction process and make reducing gases: carbon monoxide and sulfur dioxide generated by the combustion of the high sulfur coal be in full contact, so as to improve the reduction efficiency of the process and expand the treatment scale of the process; and (5) cooling: mixing reduced coarse-grained slag mixture and fine-grained slag mixture in step (4), conducting water quenching with water for cooling the slag mixture to below 300° C., and discharging the product.

Figure 3:
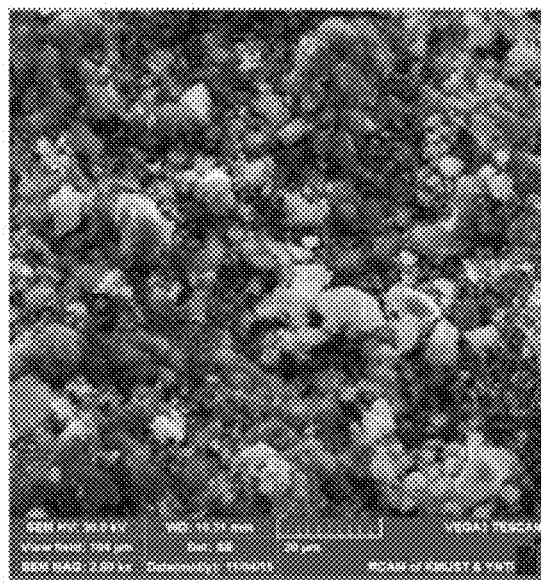
FIG. 3 is an SEM image of chromium slag according to Embodiment 1 of the present invention.

FIG. 3 is an SEM image of the chromium slag according to this embodiment. It can be seen from this figure that, chromium slag grains that have not been detoxified are relatively coarse, and has a relatively loose microstructure.

Figure 4:
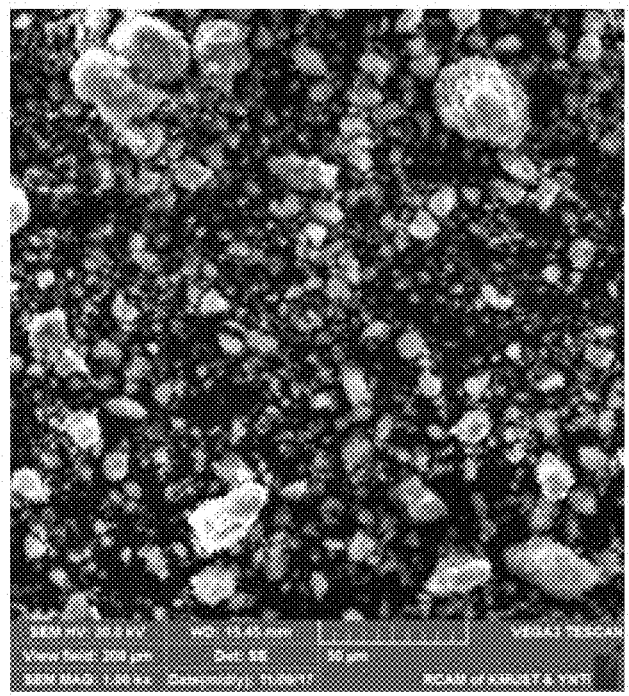
FIG. 4 is an SEM image of detoxified chromium slag according to Embodiment 1 of the present invention.

FIG. 4 is an SEM image of detoxified chromium slag according to this embodiment. It can be seen from this figure that, detoxified chromium slag grains are relatively fine and in denser distribution because an original mineral structure containing hexavalent chromium is decomposed during the reaction.

Through measurement, it can be learned that a leaching value of hexavalent chromium in the discharged chromium slag is 0.02 mg/L, and sulfur dioxide in exhaust gas is less than 200 mg/m$^3$. After the detoxified chromium slag is naturally stockpiled for 30 days, the measured leaching value of hexavalent chromium is 0.05 mg/L, which is far lower than an environmental protection requirement of the process for detoxifying chromium slag.

Embodiment 2

A method for detoxifying chromium slag by using high sulfur coal is provided, specifically including the following steps:

(1) material preparation: sieving chromium slag into coarse-grained chromium slag (greater than or equal to 10 meshes) and fine-grained chromium slag (less than 10 meshes), air-drying both the coarse-grained chromium slag and the fine-grained chromium slag at normal temperature for 24 h, and crushing both the coarse-grained chromium slag and the fine-grained chromium slag until they can pass through a sieve of 20 meshes; and drying high sulfur coal at normal temperature for 24 h, and crushing the high sulfur coal until it can pass through the sieve of 20 meshes;

(2) mixing: separately mixing the coarse-grained chromium slag and the fine-grained chromium slag in step (1) with the high sulfur coal uniformly, to obtain a coarse-grained slag mixture and a fine-grained slag mixture, where the mass fractions of chromium slag in the coarse-grained slag mixture and the fine-grained slag mixture are both 85%, and the mass fraction of the high sulfur coal is 15%;

(3) adjustment of pH values and moisture content: adjusting pH values of the coarse-grained slag mixture and the fine-grained slag mixture to 10 and moisture content of the slag mixture to 15% by spraying a $FeSO_4$ solution with a mass fraction of 5%;

(4) reduction: in a rotary kiln, separately conducting reduction on the coarse-grained slag mixture and the fine-grained slag mixture whose pH values are adjusted in step (3), where the reduction temperature of the fine-grained slag mixture is 700° C., the reduction time of the fine-grained slag mixture is 25 min, the reduction temperature of the coarse-grained slag mixture is 900° C., and the reduction time of the coarse-grained slag mixture is 30 min; the rotary kiln is internally provided with a helical stirring device; the helical stirring device is the same as that in Embodiment 1; and helical stirring is conducted to make the chromium slag and the high sulfur coal fully mixed in the reduction process and make reducing gases: carbon monoxide and sulfur dioxide generated by the combustion of the high sulfur coal be in full contact, so as to improve the reduction efficiency of the process and expand the treatment scale of the process; and (5) cooling: mixing reduced coarse-grained slag mixture and fine-grained slag mixture in step (4), conducting water quenching with a ferrous sulfate solution with a mass fraction of 1% for cooling the slag mixture to below 300° C., and discharging the product.

Figure 5:
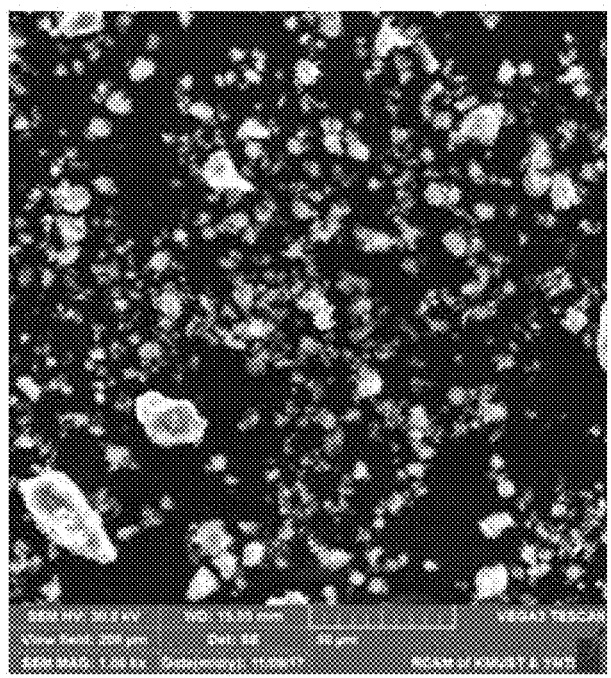
FIG. 5 is an SEM image of detoxified chromium slag according to Embodiment 2 of the present invention.

FIG. 5 is an SEM image of detoxified chromium slag according to this embodiment. It can be seen from this figure that, the detoxified chromium slag has denser distribution and a finer grain size due to the higher reduction temperature. This indicates that higher temperature leads to more thorough decomposition of a mineral containing hexavalent chromium in the chromium slag, which also facilitates detoxification of the chromium slag.

Through measurement, it can be learned that a leaching value of hexavalent chromium in the discharged chromium slag is 0.01 mg/L, and sulfur dioxide in exhaust gas is less than 200 mg/m$^3$. After the detoxified chromium slag is naturally stockpiled for 30 days, the measured leaching value of hexavalent chromium is 0.02 mg/L, which is far lower than an environmental protection requirement of the process for detoxifying chromium slag.

Embodiment 3

A method for detoxifying chromium slag by using high sulfur coal is provided, specifically including the following steps:

(1) material preparation: sieving chromium slag into coarse-grained chromium slag (greater than or equal to 10 meshes) and fine-grained chromium slag (less than 10 meshes), air-drying both the coarse-grained chromium slag and the fine-grained chromium slag at normal temperature for 28 h, and crushing both the coarse-grained chromium slag and the fine-grained chromium slag until they can pass through a sieve of 20 meshes; and air-drying high sulfur coal at normal temperature for 24 h, and crushing the high sulfur coal until it can pass through the sieve of 20 meshes;

(2) mixing: separately mixing the coarse-grained chromium slag and the fine-grained chromium slag in step (1) with the high sulfur coal uniformly, to obtain a coarse-grained slag mixture and a fine-grained slag mixture, where the mass fractions of chromium slag in the coarse-grained slag mixture and the fine-grained slag mixture are both 90%, and the mass fraction of the high sulfur coal is 10%;

(3) adjustment of pH values and moisture content: adjusting pH values of the coarse-grained slag mixture and the fine-grained slag mixture to 8.0 and moisture content of the slag mixture to 18% by spraying a $H_2SO_4$ solution with a mass fraction of 5%;

(4) reduction: in a rotary kiln, separately conducting reduction on the coarse-grained slag mixture and the fine-grained slag mixture whose pH values are adjusted in step (3), where the reduction temperature of the fine-grained slag mixture is 500° C., the reduction time of the fine-grained slag mixture is 10 min, the reduction temperature of the coarse-grained slag mixture is 1000° C., and the reduction time of the coarse-grained slag mixture is 10 min; the rotary kiln is internally provided with a helical stirring device; the helical stirring device is the same as that in Embodiment 1; and helical stirring is conducted to make the chromium slag and the high sulfur coal fully mixed in the reduction process and make reducing gases: carbon monoxide and sulfur dioxide generated by the combustion of the high sulfur coal be in full contact, so as to improve the reduction efficiency of the process and expand the treatment scale of the process; and (5) cooling: mixing reduced coarse-grained slag mixture and fine-grained slag mixture in step (4), conducting water quenching with a $FeSO_4$ solution with a mass fraction of 5% for cooling the slag mixture to below 300° C., and discharging the product.

Through measurement, it can be learned that a leaching value of hexavalent chromium in the discharged chromium slag cannot be detected, and sulfur dioxide in exhaust gas is less than 200 mg/m$^3$. After the detoxified chromium slag is naturally stockpiled for 30 days, the measured leaching value of hexavalent chromium is 0.01 mg/L, which is far lower than an environmental protection requirement of the process for detoxifying chromium slag.

Embodiment 4

A method for detoxifying chromium slag by using high sulfur coal is provided, specifically including the following steps:

(1) material preparation: sieving chromium slag into coarse-grained chromium slag (greater than or equal to 10 meshes) and fine-grained chromium slag (less than 10 meshes), air-drying both the coarse-grained chromium slag and the fine-grained chromium slag at normal temperature for 30 h, and crushing both the coarse-grained chromium slag and the fine-grained chromium slag until they can pass through a sieve of 20 meshes; and air-drying high sulfur coal at normal temperature for 24 h, and crushing the high sulfur coal until it can pass through the sieve of 20 meshes;

(2) mixing: separately mixing the coarse-grained chromium slag and the fine-grained chromium slag in step (1) with the high sulfur coal uniformly, to obtain a coarse-grained slag mixture and a fine-grained slag mixture, where the mass fractions of chromium slag in the coarse-grained slag mixture and the fine-grained slag mixture are both 90%, and the mass fraction of the high sulfur coal is 10%;

(3) adjustment of pH values and moisture content: adjusting pH values of the coarse-grained slag mixture and the fine-grained slag mixture to 9 and moisture content of the slag mixture to 16% by spraying a $FeSO_4$ solution with a mass fraction of 5%;

(4) reduction: in a rotary kiln, separately conducting reduction on the coarse-grained slag mixture and the fine-grained slag mixture whose pH values are adjusted in step (3), where the reduction temperature of the fine-grained slag mixture is 650° C., the reduction time of the fine-grained slag mixture is 15 min, the reduction temperature of the coarse-grained slag mixture is 850° C., and the reduction time of the coarse-grained slag mixture is 25 min; the rotary kiln is internally provided with a helical stirring device; the helical stirring device is the same as that in Embodiment 1; and helical stirring is conducted to make the chromium slag and the high sulfur coal fully mixed in the reduction process and make reducing gases: carbon monoxide and sulfur dioxide generated by the combustion of the high sulfur coal be in full contact, so as to improve the reduction efficiency of the process and expand the treatment scale of the process; and (5) cooling: mixing reduced coarse-grained slag mixture and fine-grained slag mixture in step (4), conducting water quenching with a $FeSO_4$ solution with a mass fraction of 3% for cooling the slag mixture to below 300° C., and discharging the product.

Through measurement, it can be learned that a leaching value of hexavalent chromium in the discharged chromium slag cannot be detected, and sulfur dioxide in exhaust gas is less than 200 mg/m$^3$. After the detoxified chromium slag is naturally stockpiled for 30 days, the measured leaching value of hexavalent chromium is 0.02 mg/L, which is far lower than an environmental protection requirement of the process for detoxifying chromium slag.

The foregoing descriptions are only preferred implementation manners of the present disclosure. It should be noted that for a person of ordinary skill in the art, several improvements and modifications may further be made without departing from the principle of the present disclosure. These improvements and modifications should also be deemed as falling within the protection scope of the present disclosure.

What is claimed is:

1. A method for detoxifying chromium slag by using high sulfur coal, specifically comprising the following steps:
    (1) sieving chromium slag into coarse-grained chromium slag and fine-grained chromium slag, wherein a grain size of the coarse-grained chromium slag is greater than or equal to 10 meshes, and a grain size of the fine-grained chromium slag is less than 10 meshes; air-drying and crushing both the coarse-grained chromium slag and the fine-grained chromium slag; and air-drying and crushing high sulfur coal;
    (2) separately mixing the crushed coarse-grained chromium slag and fine-grained chromium slag in step (1) with the high sulfur coal uniformly, to obtain a coarse-grained slag mixture and a fine-grained slag mixture;
    (3) adjusting pH values of the coarse-grained slag mixture and the fine-grained slag mixture in step (2) to 8.0-11.0 and moisture content thereof to 12%-18% by spraying water or an acid solution;

(4) separately conducting stirring and reduction on the treated coarse-grained slag mixture and fine-grained slag mixture in step (3) in a rotary kiln, wherein the reduction temperature of the fine-grained slag mixture is 500-700° C., the reduction time of the fine-grained slag mixture is 10-30 min, the reduction temperature of the coarse-grained slag mixture is 800-1000° C., and the reduction time of the coarse-grained slag mixture is 10-30 min; and (5) mixing reduced coarse-grained slag mixture and fine-grained slag mixture in step (4), conducting water quenching for cooling the slag mixture to below 300° C., and discharging the product.

2. The method for detoxifying chromium slag by using high sulfur coal according to claim 1, wherein the coarse-grained chromium slag, the fine-grained chromium slag, and the high sulfur coal in step (1) are air-dried at normal temperature for more than 24 h, and the coarse-grained chromium slag, the fine-grained chromium slag, and the high sulfur coal are all crushed until they can pass through a sieve of 20 meshes.

3. The method for detoxifying chromium slag by using high sulfur coal according to claim 1, wherein in step (2), the mass fractions of chromium slag in the coarse-grained slag mixture and the fine-grained slag mixture are 85%-95%, and the mass fraction of high sulfur coal is 5%-15%.

4. The method for detoxifying chromium slag by using high sulfur coal according to claim 1, wherein the acid solution in step (3) is a dilute $H_2SO_4$ solution or a $FeSO_4$ solution.

5. The method for detoxifying chromium slag by using high sulfur coal according to claim 1, wherein the rotary kiln in step (4) is internally provided with a helical stirring device; the helical stirring device comprises a helical blade (1) and a rotary rod (2); the rotary rod (2) traverses the rotary kiln; and the helical blade (1) is arranged on the rotary rod (2).

6. The method for detoxifying chromium slag by using high sulfur coal according to claim 1, wherein a solvent for the water quenching in step (5) is water or a $FeSO_4$ solution, and the mass fraction of the $FeSO_4$ solution is 1%-5%.

\* \* \* \* \*